(12) United States Patent
Tachibana et al.

(10) Patent No.: US 8,024,659 B2
(45) Date of Patent: Sep. 20, 2011

(54) DIVIDING A LARGE INPUT PAGE INTO A PLURALITY OF SMALLER INPUT PAGES TO PROVIDE EASIER USE OF A TERMINAL WITH A SMALL SCREEN

(75) Inventors: Tohru Tachibana, Yokohama (JP); Yuhichi Takahashi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 2417 days.

(21) Appl. No.: 10/674,180

(22) Filed: Sep. 29, 2003

(65) Prior Publication Data
US 2004/0085350 A1 May 6, 2004

(30) Foreign Application Priority Data
Oct. 31, 2002 (JP) .................. 2002-319005

(51) Int. Cl.
*G06F 3/00* (2006.01)
*G06F 3/01* (2006.01)
(52) U.S. Cl. ......... 715/738; 715/739; 715/744; 715/746
(58) Field of Classification Search .................. 715/738, 715/504, 739, 744, 746, 759, 792, 799
See application file for complete search history.

(56) References Cited

U.S. PATENT DOCUMENTS

| | | | | |
|---|---|---|---|---|
| 6,556,217 B1 * | 4/2003 | Makipaa et al. | ............. | 345/667 |
| 6,714,201 B1 * | 3/2004 | Grinstein et al. | ............. | 345/474 |
| 6,850,899 B1 * | 2/2005 | Chow et al. | ..................... | 705/26 |
| 6,964,020 B1 * | 11/2005 | Lundy | ........................... | 715/534 |
| 6,974,928 B2 * | 12/2005 | Bloom | ........................ | 209/583 |
| 7,124,098 B2 * | 10/2006 | Hopson et al. | .................. | 705/26 |
| 7,181,731 B2 * | 2/2007 | Pace et al. | ..................... | 717/136 |
| 7,194,730 B2 * | 3/2007 | Pramberger | .................. | 717/120 |
| 7,257,596 B1 * | 8/2007 | Williams et al. | ..................... | 1/1 |
| 7,685,577 B2 * | 3/2010 | Pace et al. | ..................... | 717/136 |
| 7,774,284 B2 * | 8/2010 | Williams et al. | .............. | 705/300 |
| 7,792,947 B1 * | 9/2010 | Kembel et al. | ................ | 709/224 |
| 2002/0032739 A1 * | 3/2002 | Iida | .............................. | 709/206 |
| 2003/0130897 A1 * | 7/2003 | Pickover et al. | ................ | 705/26 |
| 2003/0172135 A1 * | 9/2003 | Bobick et al. | ................ | 709/220 |
| 2003/0210277 A1 * | 11/2003 | Harada | ....................... | 345/810 |
| 2003/0225632 A1 * | 12/2003 | Tong et al. | ...................... | 705/27 |
| 2004/0051728 A1 * | 3/2004 | Vienneau et al. | ............. | 345/723 |
| 2004/0066403 A1 * | 4/2004 | Nagata et al. | ................. | 345/748 |
| 2004/0068443 A1 * | 4/2004 | Hopson et al. | .................. | 705/26 |
| 2004/0103371 A1 * | 5/2004 | Chen et al. | .................... | 715/513 |
| 2009/0138825 A1 * | 5/2009 | Duarte | ......................... | 715/838 |

FOREIGN PATENT DOCUMENTS

| | | |
|---|---|---|
| JP | 2001-125862 | 5/2001 |
| JP | 2002-189673 | 7/2002 |

* cited by examiner

*Primary Examiner* — Nicholas Augustine
(74) *Attorney, Agent, or Firm* — Winstead, P.C.

(57) ABSTRACT

In a terminal with a display screen that is too small to accept a required input in its entirety, a user is enabled to perform the input without intricate operation. The terminal displays input pages downloaded from a server via a network, and transmits input information entered into the pages by the user. The terminal comprises a page display section, which displays a plurality of input pages using a browser executed on the terminal, an input information storage section, which stores a plurality of input parameters entered into more than one of the input pages, and an input information transmission section, which combines the input parameters and transmits the combination to the server in response to an instruction.

13 Claims, 6 Drawing Sheets

| INPUT PARAMETER | PACKAGE IDENTIFICATION INFORMATION | INPUT IDENTIFICATION INFORMATION | DESTINATION INFORMATION | LAST PAGE |
|---|---|---|---|---|
| A=35 & B=ABCD | Sushi Order 01 | 0 | URL1 | NO |
| C=5 & D=xx | Sushi Order 01 | 0 | URL1 | YES |
| A=32 & B=xxxx | Sushi Order 01 | 1 | URL1 | NO |
| C=3 & D=ÆÆ | Sushi Order 01 | 1 | URL1 | YES |
| E=4 & F=xx | Sushi Order 02 | 0 | URL2 | NO |
| G=5 & H=ÆÆÆ | Sushi Order 02 | 0 | URL2 | NO |
| ⋮ | ⋮ | ⋮ | ⋮ | ⋮ |

| PACKAGE IDENTIFICATION INFORMATION | INPUT IDENTIFICATION INFORMATION |
|---|---|
| Sushi Order 01 | 1 |
| Sushi Order 02 | 0 |
| ⋮ | ⋮ |

DIVIDING A LARGE INPUT PAGE INTO A PLURALITY OF SMALLER INPUT PAGES TO PROVIDE EASIER USE OF A TERMINAL WITH A SMALL SCREEN

FIELD OF THE INVENTION

The present invention relates to an information terminal, and a transmission-reception proxy apparatus, communication system, communication method, program, and recording medium for processing information input into the information terminal by a user, where the screen of the information terminal is too small to display the totality of the input information required by a server.

BACKGROUND

Terminals have heretofore been proposed which temporarily store an input from a user accepted when the terminal is off-line, that is, when the terminal is not connected to a communication network, and which later transmits the input to a server. See, for example, Japanese Patent Publication No. 2001-525093. However, the above-described Japanese document does not disclose a method for enabling a user to enter a desired input without requiring an intricate operation when the terminal's input screen is too small to accommodate the input required by the server.

SUMMARY

Consequently, an object of the present invention is to provide an information terminal, transmission-reception proxy apparatus, communication system, communication method, program, and recording medium which can solve the above-described problem.

The present invention includes an information terminal which displays input pages downloaded from a server via a network, and which transmits, using the network, information entered into the pages by a user. The information terminal comprises a page display section for displaying a plurality of input pages using a browser executed on the information terminal, an input information storage section for storing a plurality of parameters entered using more than one of the input pages, and an input information transmission section for transmitting the plurality of input parameters in response to receiving a transmission instruction. The invention also includes a transmission-reception proxy apparatus, a communication system, a communication method for realizing these apparatuses, a program, and a recording medium in which the program is recorded.

BRIEF DESCRIPTION OF THE DRAWINGS

FIGS. 3A and 3B show examples of data stored in an input information storage section of the information terminal.

DETAILED DESCRIPTION

The present invention will be described hereinafter using an embodiment that is exemplary rather than limiting.

Figure 1:
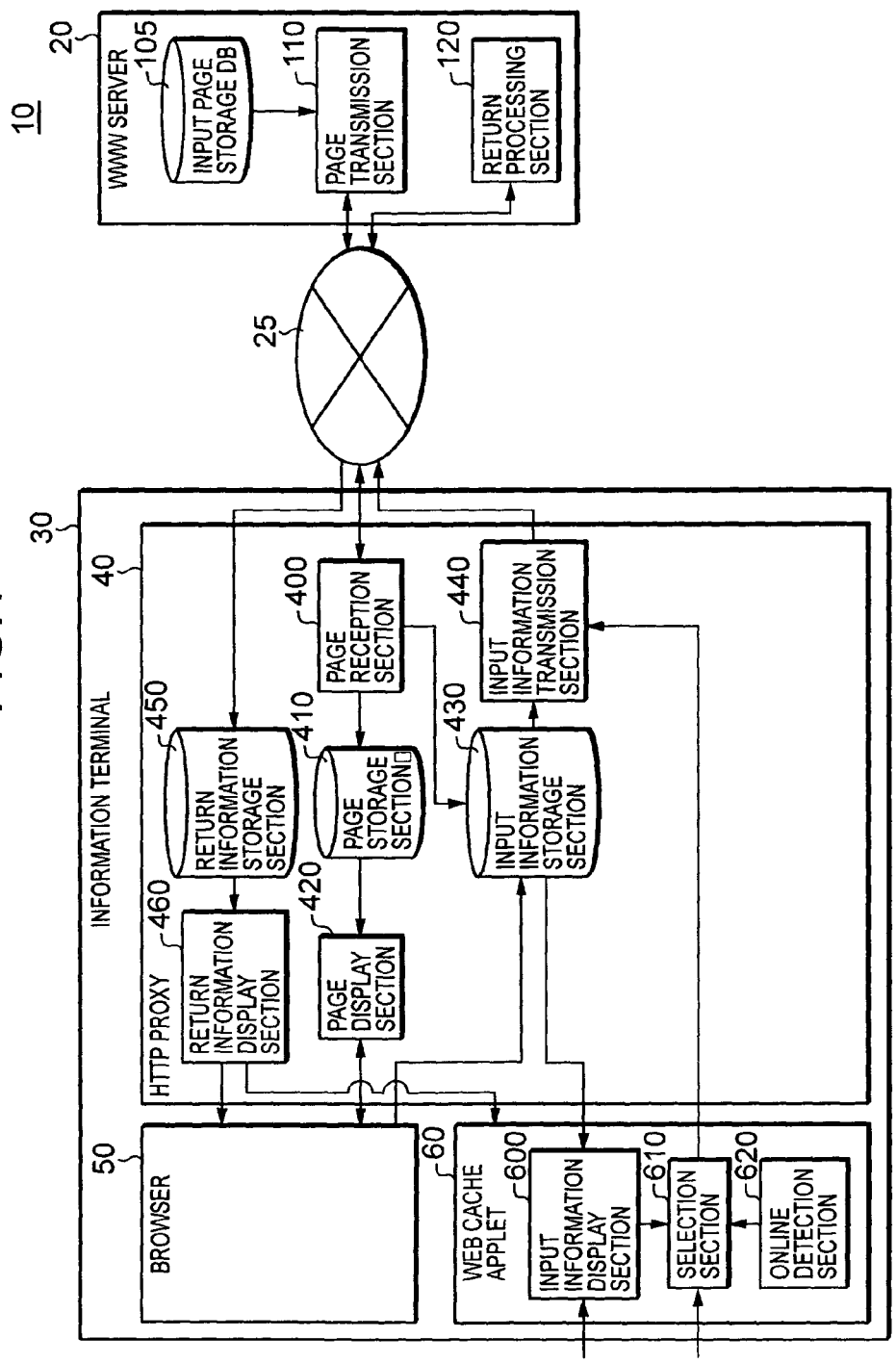
FIG. 1 is a function block diagram of a communication system.

FIG. 1 is a block diagram of a communication system 10. The communication system 10 includes a World Wide Web (WWW) server 20 which provides a page that accepts input from a user, a network 25 for communication between the WWW server 20 and an information terminal 30, and the information terminal 30, which may be a portable communication terminal such as a cellular phone, for accepting the input from the user.

In response to a request instruction from the information terminal 30, the WWW server 20 transmits, to the information terminal 30, a plurality of pages enabling the user to enter a plurality of input parameters. The information terminal 30 stores the input parameters. Also, the information terminal 30 combines the stored input parameters and transmits the combination as input information to the WWW server 20 in response to an instruction.

Since the information terminal 30 combines a plurality of the input parameters and transmits the combination desired by the WWW server 20 to the WWW server 20, the WWW server 20 can receive and process the input information expeditiously. For example, the WWW server 20 can receive the input information without establishing a plurality of communication connections in order to receive each individual input parameter.

The WWW server 20 includes an input page storage database 105 for storing the input pages to be sent to the information terminal 30, a page transmission section 110 for transmitting the input pages in response to the instruction from the information terminal 30, and a return processing section 120 for sending a reply concerning the input information received from the information terminal 30.

The input page storage database 105 stores the pages for each part of the input information needed from the user, and associates each of the input parameters both with package identification information for identifying the input pages and with destination information for identifying a return destination of the input parameters. For example, when the input information includes a user's contact address, the input parameters may be a user's name, user's address, and user's phone number. In this case, the input pages may include a first input page for the user's name, a second input page for the user's address, and a third input page for the user's phone number.

The input page storage database 105 associates the package identification information with each of the plurality of input pages, and thus may be used for determining whether or not a particular input page belongs to a particular package of input pages. The input page storage database 105 associates and stores the destination information that specifies where the parameters of the pages that belong to a package are to be returned. The input page storage database 105 may further store information indicating a display order for the pages belonging to a package, and information for identifying the last page of the package.

When the page transmission section receives, via the network 25, an instruction from a page reception section 400 requesting input pages, the page transmission section 110 associates the plurality of input pages with the package identification information, destination information, display order, and last page information; selects and receives the input pages from the input page storage database 105; and sends the input pages to the page reception section 110.

When the WWW server 20 receives the needed input information from the input information transmission section 440, the return processing section 120 processes the input information, and sends a result to a return information storage section 450. For example, the result may be an acknowledgment that the input information has been received, or may be the outcome of processing the input information in accordance with its content.

The information terminal 30 includes a transmission-reception proxy apparatus such as an HTTP proxy 40, a browser 50 for displaying pages and accepting input from the user, and a web cache applet 60 for accepting instructions from the user regarding transmission of the input information.

The HTTP proxy 40 stores the input pages received from the WWW server 20, and successively displays the input pages one by one using the browser 50. The browser 50 stores the parameters entered by the user in the HTTP proxy 40 together with the destination information associated with the page. When the web cache applet 60 receives an instruction to send the input information, the HTTP proxy 40 combines the stored input parameters and sends the combination to the WWW server 20. Subsequently, the HTTP proxy 40 receives return information from the WWW server 20, which has received the input information, and displays the return information using the browser 50 or web cache applet 60.

The HTTP proxy 40 includes the page reception section 400, a page storage section 410, a page display section 420, an input information storage section 430, the input information transmission section 440, the return information storage section 450, and a return information display section 460.

The page reception section 400 downloads the input pages from the WWW server 20; associates the downloaded pages with the package identification information, destination information, display order, and last page information; and stores the pages in the page storage section 410. The page reception section 400 also associates the last page information with the package identification information, and sends the information to the input information storage section 430.

The page storage section 410 associates the input pages with the package identification information, destination information, display order, and last page information; receives the input pages from the page reception section 400; and stores the input pages. The page storage section 410 successively sends the stored input pages to the page display section 420.

The page display section 420 successively receives the input pages of a package from the page storage section 410, and successively displays the pages one by one using the browser 50. More specifically, the page display section 420 first displays an input page stored in the page storage section 410. Then, after receiving an indication from the browser 50 that the user has completed his or her entry into the page, the page display section 420 acquires and displays the next input page from the page storage section 410 in accordance with the display order stored in the page storage section 410. The page display section 420 repeats the above-described operation until the last input page of the package has been displayed.

The input information storage section 430 associates the input parameters with the input pages, and receives and stores the input parameters from the browser 50. The input information storage section 430 receives the last page information from the page reception section 400.

When the parameters belonging to a certain package are entered, the input information storage section 430 associates input identification information (e.g., an input identification ID, which is a value to identify each package) with the parameters. The input information storage section 430 stores input identification information to be associated with the input parameters that belong to each package. Once the input parameters in the last input page have been, the input information storage section 430 increments the input identification ID corresponding to the package associated with the last page.

The input information storage section 430 associates the input information with the destination information, input identification information, and package identification information, in preparation for sending the information to an input information display section 600.

In response to an instruction from a selection section 610, the input information transmission section 440 associates the package identification and input identification of the input information to be transmitted. The input information transmission section 440 selects the input parameters constituting the desired input information, combines the parameters, and sends the combination to the return processing section 120 via the network 25.

The web cache applet 60 includes the input information display section 600, the selection section 610, and an online detection section 620.

The input information display section 600 associates the input information with the destination information, package identification information, and input identification information, and receives the input information from the input information storage section 430. Upon receiving an instruction to display the input information, for example an instruction from the user, the input information display section 600 displays input information stored in the input information storage section 430 to the user, for example in the form of a table. The input information display section 600 sends the package identification information and input identification information to the selection section 610 in response to an instruction from the selection section 610.

After receiving an external instruction to select the input information to be transmitted from the elements of the input information displayed by the input information display section 600, and receiving an online notice from the online detection section 620, the selection section 610 receives the package identification information for identifying the input information selected by the selection instruction, and the input information from the input information display section 600, and sends the information to the input information transmission section 440.

The online detection section 620 determines whether or not the information terminal 30 is in an online state and can communicate with an external apparatus. For example, the online detection section 620 may periodically try to communicate with the external apparatus (e.g., the WWW server 20) to determine whether or not the terminal is online. When the information terminal 30 is a cellular phone, the online detection section 620 may query the status of a cellular base station to determine whether or not the terminal is online. When the online detection section 620 determines whether the information terminal 30 is online, the online detection section 620 section sends an online notice indicating the online state to the selection section 610.

Although the input information transmission section 440 sends the input information selected by the selection section 610 to the WWW server 20 in the exemplary embodiment of FIG. 1, this is not a limitation of the invention, and other modes of transmission based on other conditions may also be used. For example, when the online detection section 620 detects the online state, the input information transmission section 440 may send all the input information stored in the input information storage section 430 to the WWW server 20, or it may send all the information once the last input parameter has been entered, and so forth.

In this manner, when the screen of the information terminal is relatively small and the totality of the input information cannot collectively be displayed, the communication system 10 can display the plurality of input pages one by one, so that the user of the information terminal 30 may enter the input information in parts. This presents a comfortable environment to the user. Moreover, the selection section 610 can select the input information to be sent to the WWW server 20 from the information already entered in accordance with a user's desire. Furthermore, since the information terminal 30 combines the individual parameters entered into the respective input pages and sends the combination to the WWW server 20, the WWW server 20 can receive desired input information efficiently.

Figure 2:
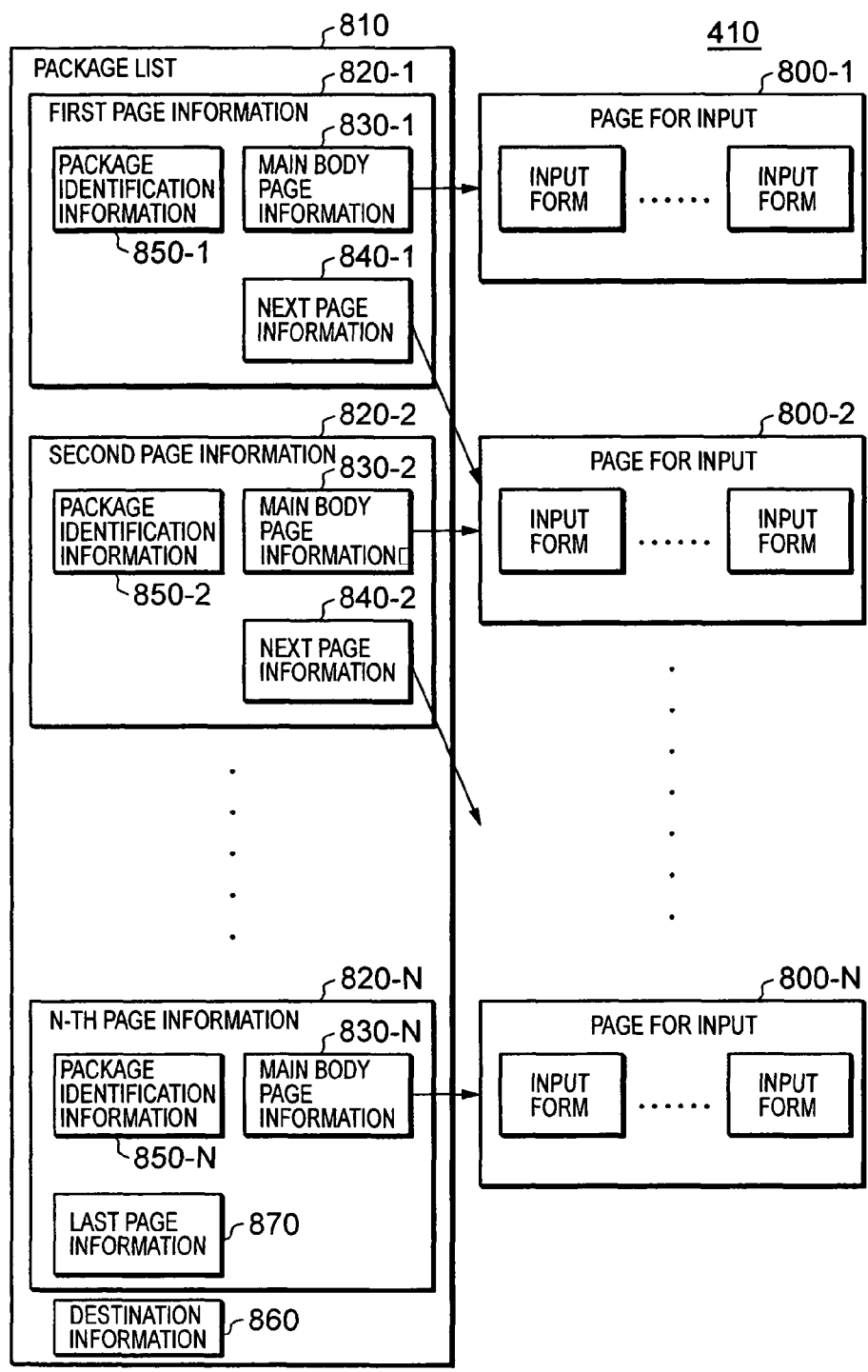
FIG. 2 shows an example of input pages stored in a page storage section of an information terminal.

FIG. 2 shows an example of the input pages stored in the page storage section 410. The page storage section 410 stores input pages 800-1 to 800-N, and a package list 810. Elements described with reference to this drawing may be specified in, for example, an extensible markup language (XML). That is, the page storage section 410 associates text data that indicates the respective elements of the drawing with meta data (e.g., tag information) for defining the text data, and stores the data. For example, for input page 800-1, the text data indicating the contents of the input page may be associated with the tag information indicating that the text is data for input.

The pages 800-1 to 800-N are input pages for the information to be entered by the user as the input parameters. In this example, each of the input pages for 800-1 to 800-N includes at least one input parameter.

In another example, however, not all of the pages 800-1 to 800-N necessarily include an input parameter. For example, an input page 800-K may include only instructions for the next input page 800-(K+1), and may not itself accept the entry of an input parameter. In this case, even when the instruction page and the subject input page cannot be displayed simultaneously on the screen of the information terminal 30, the input page can be displayed after the instruction page, thereby presenting a convenient input environment to the user.

The package list 810 includes first page information 820-1 to N-th page information 820-N associated with the input pages 800-1 to 800-N, and destination information 860. The first page information 820-1 to 820-N−1 includes main body page information 830-1 to 830-N−1, next page information 840-1 to 840-N−1, and package identification information 850-1 to 850-N−1. Each page information from second page 820-2 to N−1 page 820-N−1 has substantially the same organization and content as that of the first page information 820-1; further descriptions are therefore omitted hereinafter.

The main body page information 830-1 stores information for identifying the input page 800-1. The next page information 840-1 stores information for identifying the page to be displayed by the browser 50 after the input page 800-1, for example, information for identifying input page 800-2.

In this manner, the page storage section 410 associates and stores the main body page information 830-1, which is the information for identifying the input page 800-1, with the next page information 840-1 for identifying the input page to be displayed by the browser 50 after the input page 800-1 is displayed. Therefore, the page display section 420 specifies the display order of the input pages stored in the page storage section 410, and can successively display the pages one by one for each package. In the example illustrated by FIG. 2, the page display section 420 can successively display the pages for input 800-1 to 800-N in this order.

The package identification information 850-1 identifies the input pages used to enter the input parameters of a package, for example, the package of input pages 800-1 to 800-N. The package identification information may include, for example, a character string for identifying each package, or a numeric value. The package identification information may be set beforehand by the designer of the input pages, or may be set by the page reception section 400 when the page reception section 400 receives the input pages.

Since the page storage section 410 associates and stores each of the input pages with the package identification information in this manner, the input information storage section 430 can appropriately select the input parameters for a package.

Unlike the first page information 820-1, the N-th page information 820-N does not ordinarily include next-page information 840-N. The N-th page information 820-N may, however, include last page information 870. The input information transmission section 440 can refer to the last page information 870 to identify the last page of the package.

The destination information 860 identifies where the input information transmission section 440 transmits the input parameters of the input pages 800-1 to 800-N. The destination information 860 may be, for example, a uniform resource locator (URL) indicating a location of a web page when the input pages 800-1 to 800-N are web pages on a WWW system. In another example, the destination information 860 may be a name that identifies a destination server, an IP address, a communication path used to reach the destination server, or a mail address indicating the destination.

The page reception section 400 receives the destination information 860 and stores the destination information 860 in the page storage section 410. Using the stored destination information 860, the input information transmission section 440 can transmit the input information to an appropriate transmission destination.

FIGS. 3A and 3B show, respectively, examples of data stored in the input information storage section 430, and the input parameters stored in the input information storage section 430. The input information storage section 430 associates and stores the package identification information, input identification information, destination information, and last page information with the parameters input by the user through the browser 50.

For example, as shown in FIG. 3A, the input information storage section 430 stores A=35 and B=ABCD as the parameters entered in an input page for which the package identification information is SushiOrder01. The input information storage section 430 stores C=5 and D=XX as the parameters entered in another input page for which the package identification information is SushiOrder01. Further, the input information storage section 430 stores URL1 as the destination information for these parameters. The input information storage section 430 stores YES in last page field in order to indicate that the input parameters C=5 and D=XX identified by SushiOrder01 are the parameters entered in the last page of the package.

In this manner, the input information transmission section 440 can appropriately select the parameters entered into the input page that are associated with a package from among the input parameters stored in the input information storage section 430. Furthermore, the input information transmission section 440 can refer to the last page field to determine whether or not all of the parameters of all the input pages of a package have been stored in the input information storage section 430.

Moreover, with the input of the parameters of a package (e.g., SushiOrder01), the input information storage section 430 associates and stores the input identification information for mutually identifying the input information with the parameters constituting the input information. For example, the input information storage section 430 associates and stores 0 and 1 as the input identification information with A=35 and B=ABCD, A=32 and B=XXXX, respectively.

FIG. 3B shows an example of the input identification information associated with the package identification information and stored in the input information storage section 430. An example of the generation of the input identification information shown in FIG. 3A will be described with reference to this drawing. The input information storage section 430 increments the input identification information corresponding to the package (e.g., SushiOrder01) associated with the last page information when storing the input parameters (e.g., C=5 and D=XX) into the last input page identified by the last page information. For example, the input information storage section 430 changes the input identification information corresponding to SushiOrder01 to 1 from an initial value of 0. In FIG. 3A, the last page of SushiOrder02 has not yet been entered, and the input information storage section 430 stores 0 as the input identification information associated with SushiOrder02.

The input information storage section 430 associates the input identification ID increased by one with the input parameter (e.g., A=32 and B=XXXX) received later with respect to SushiOrder01; the parameters of the input information with respect to SushiOrder01 can be distinguished from one another.

As apparent from the above description, the input information transmission section 440 can refer to the input information storage section 430 to select and combine the plurality of parameters entered into the input pages associated with a package and associated with the same input identification information in the input parameters stored in the input information storage section 430, and can transmit the parameters as the input information to the WWW server 20.

The input information transmission section 440 connects the input parameters with one another, for example by using the ampersand character. For example, the input information transmission section 440 uses "&" to connect "A=35&B=ABCD" to "C=5&D=XX", and generates "A=35&B=ABCD&C=5&D=XX". The input information transmission section 440 may further combine the text data. For example, the plurality of input parameters may be represented by a plurality of text data.

Figure 4:
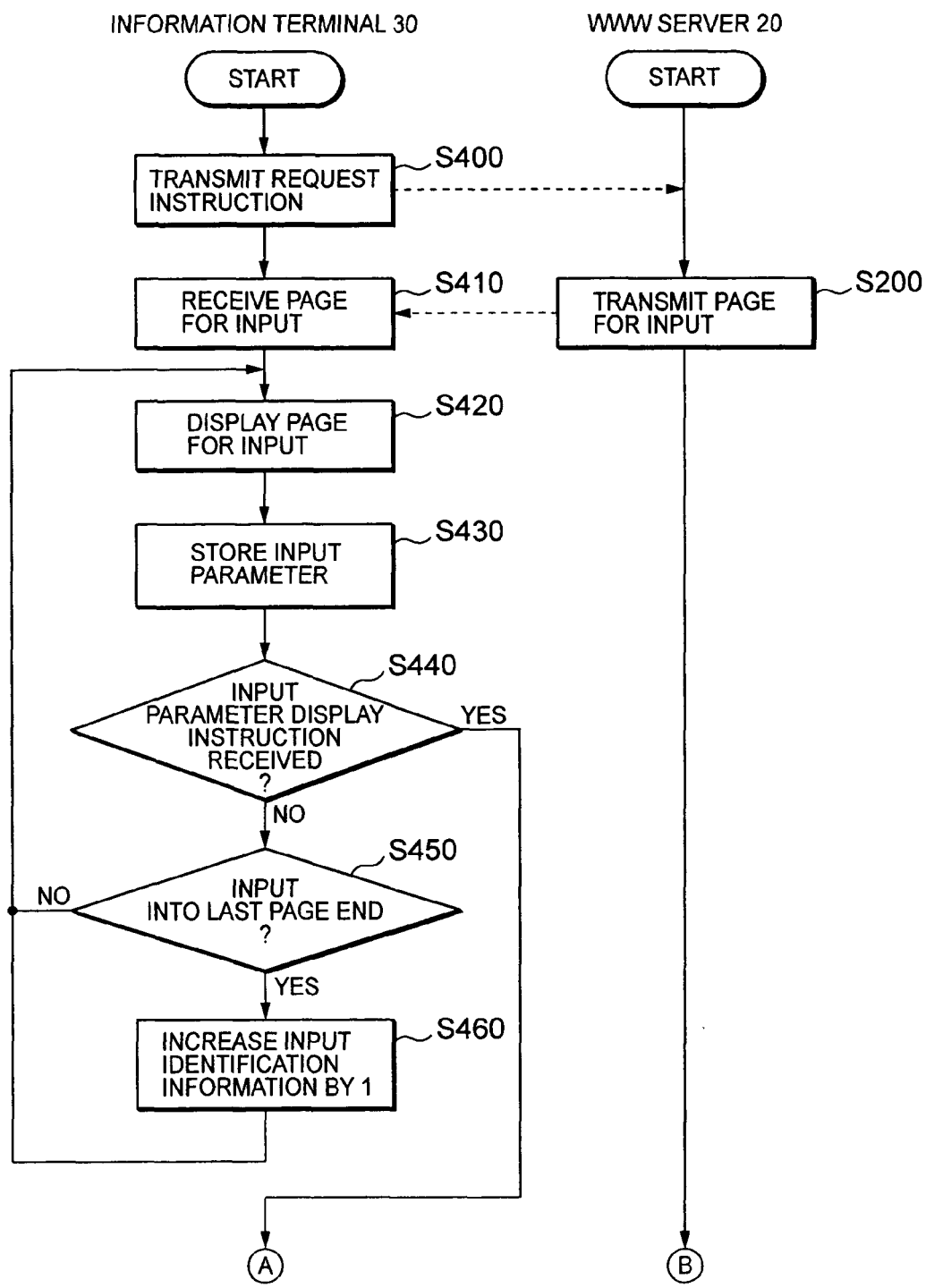
FIG. 4 shows an exemplary operational flow of the communication system illustrated in FIG. 1.

FIG. 4 shows an exemplary operational flow of the communication system 10. The page reception section 400 sends the request instruction, which is an instruction to transmit the input pages, to the WWW server 20 (S400). On receiving this instruction, the page transmission section 110 selects the plurality of input pages from the input page storage database 105, and associates the pages with the package identification information, destination information, and last page information, in preparation for sending the pages to the page reception section 400 (S200). Subsequently, the page reception section 400 associates the input pages with the package identification information, destination information, and last page information; receives the pages from the page transmission section 110; and stores the pages in the page storage section 410 (the pagesS410).

In another example, the page reception section 400 may send information indicating the type of the information terminal 30 together with the request instruction in S400. In accordance with the information indicating the type of the information terminal 30, the page transmission section 110 may select input pages whose sizes match the size of the display screen of the information terminal 30. For example, the input pages may have the same size as the display screen, may be larger than the display screen by a predetermined amount, and so forth.

Subsequently, the information terminal 30 repeatedly performs the following process. The page display section 420 successively displays the input pages of the package, which are stored in the page storage section 410, one by one on the screen of the browser 50 (S420). In order to store the parameters, the input information storage section 430 receives, from the browser 50, the parameters entered by the user into the input pages displayed by the page display section 420 in association with the destination identification information and package identification information. In this case, when receiving the parameters entered into the last page, as identified by the last page information, the input information storage section 430 further associates and stores the input parameters with the last page information. Furthermore, the input information storage section 430 associates and stores the input parameters with the input identification information (S430).

Figure 5:
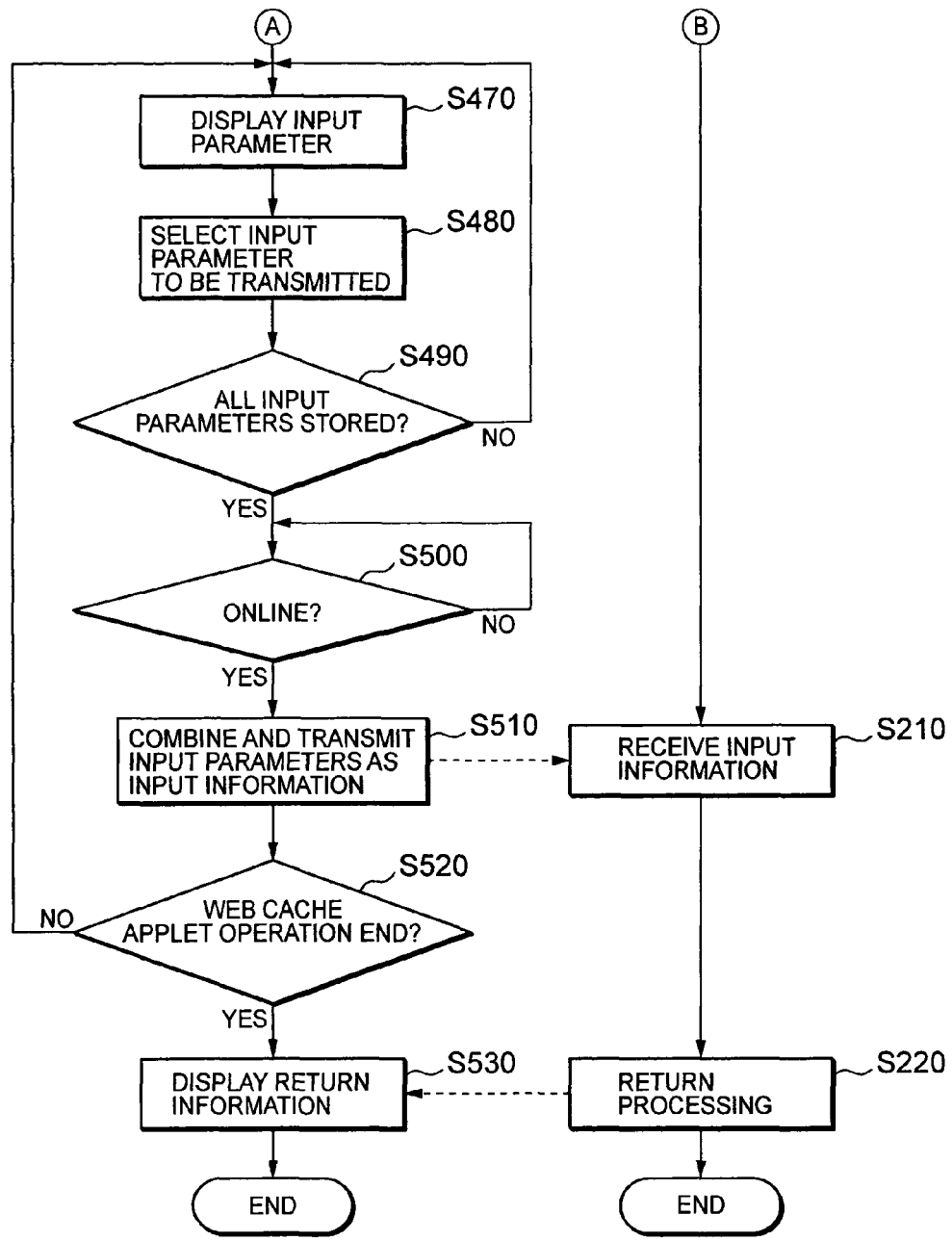
FIG. 5 shows a process performed by the display section of the information terminal upon receiving an instruction to display information entered by the user.

The input information display section 600 performs the process shown in FIG. 5 upon receiving an instruction from the user to display the input information (S440: YES). When, on the other hand, the input information display section 600 does not receive the display instruction to display the input information (S440: NO), the input information storage section 430 determines whether or not the input parameter called for by the last input page for the package has been stored (S450).

When the input information storage section 430 determines that the input parameter for the last input page of the package has been stored (S450: YES), the input identification information is incremented by one with respect to the package identification information of the input page (S460), and the process returns to S420. When, on the other hand, the input information storage section 430 determines that the input parameter for the last input page is not stored (S450: NO), the information terminal 30 returns to S420 to continue the process.

FIG. 5 shows an exemplary operational flow of the communication system 10, following FIG. 4. Upon receiving an instruction from the user to display the input information, the input information display section 600 displays all the input information (i.e., the plurality of input parameters) stored in the input information storage section 430 to the user, for example in the form of a table (S470).

Subsequently, the selection section 610 receives the external instruction to select the input information to be transmitted from the elements of input information displayed by the input information display section 600, and accordingly selects the input information to be transmitted from the input information storage section 430 (S480). The input information transmission section 440 then determines whether all the parameters constituting the selected input information have been stored. If not, (S490: NO) the flow returns to S470.

On the other hand, when the input information transmission section 440 determines that all the input parameters constituting the selected input information have been stored (S490: YES), and further determines that the online detection section 620 is in the online state (S500: YES), the input information transmission 440 section combines the input parameters, and sends the combination as the input information to the WWW server 20 (S510). The return processing section 120 receives the input information (S210), and performs the return processing in accordance with the input information (S220).

When the selection step of the input information using the web cache applet 60 by the user has not ended (S520: NO), the web cache applet 60 returns to S470 to perform a series of steps to select the input parameters again. When the selection step of the input information using the web cache applet 60 by the user has ended (S520: YES), the web cache applet 60 or browser 50 displays the return information received from the WWW server 20 to the user (S530), and the process ends.

Since the information terminal 30 combines the input information entered element-by-element by the user and sends the combination to the WWW server 20, the WWW server 20 receives the desired input information collectively, and can quickly perform the required processing.

The process described above is illustrative rather than limiting, and the communication system 10 may, for example, perform the steps in a different order than the order just mentioned. For example, the communication system 10 may change the order of determining whether all the input parameters have been stored (S490) and determining whether the system is in the online state (S500). The communication system 10 may change this order responsive to the performance of the information terminal 30, for example, depending on whether or not the communication system 10 can support high speed communication and processing.

Figure 6:
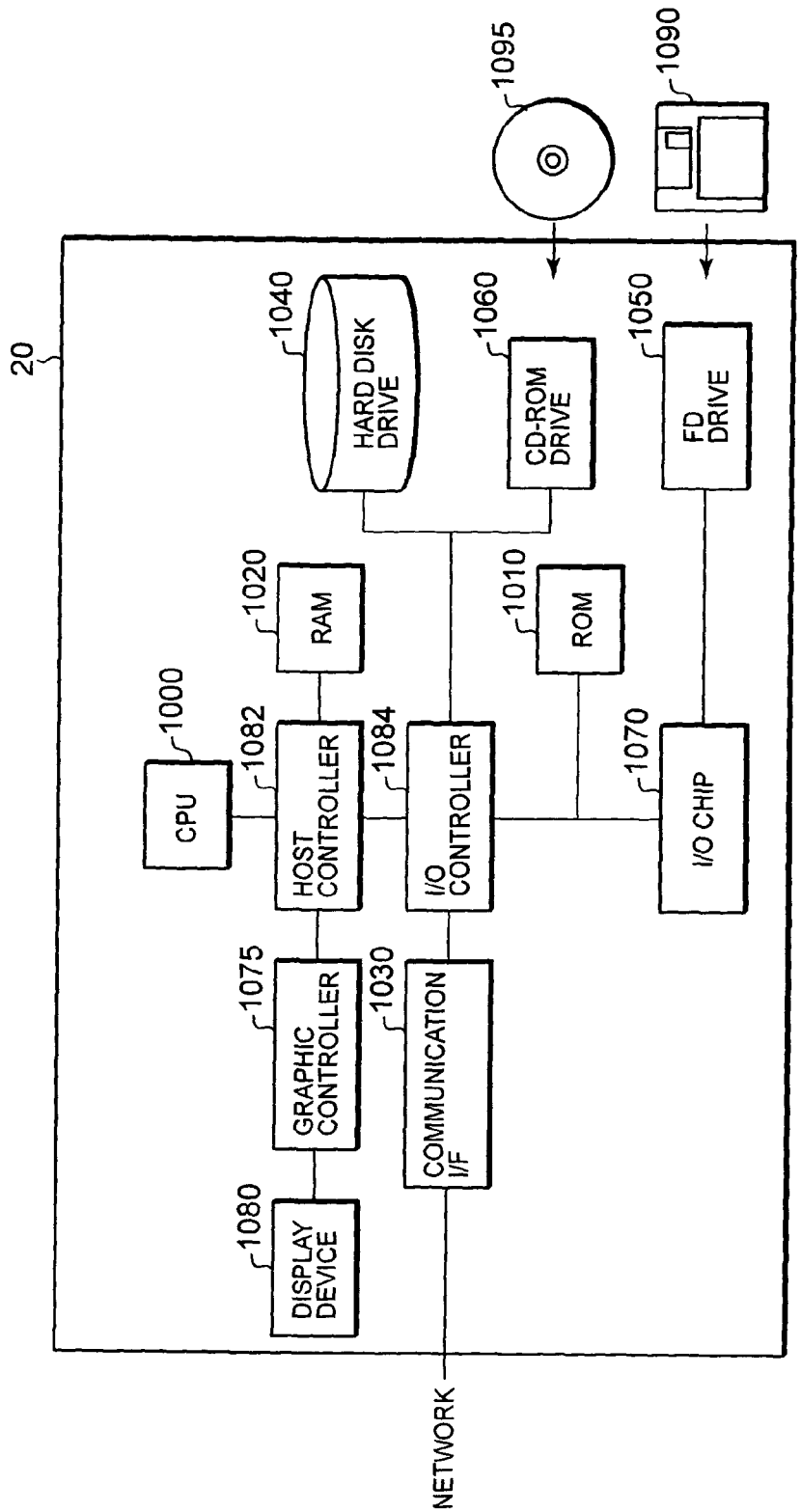
FIG. 6 shows the hardware structure of an exemplary server that is suitable for use in the communication system that is illustrated by FIG. 1.

FIG. 6 is a block diagram illustrating a hardware configuration suitable for the WWW server 20. The WWW server 20 includes a CPU peripheral section comprising a CPU 1000, a RAM 1020, a graphic controller 1075, and display device 1080, which are interconnected by a host controller 1082, an input/output section including a communication interface 1030, a hard disk drive 1040, and a CD-ROM drive 1060 connected to the host controller 1082 via an input/output controller 1084, and a legacy input/output section including a ROM 1010, a flexible disk drive 1050, and an input/output chip 1070 connected to the input/output controller 1084.

The host controller 1082 connects the RAM 1020 to the CPU 1000 and graphic controller 1075, which access the RAM 1020 at a high transfer rate. The CPU 1000 executes instructions stored in the ROM 1010 and RAM 1020, and controls components. The graphic controller 1075 acquires image data generated on a frame buffer disposed in the RAM 1020 by the CPU 1000, and displays the data on the display device 1080. The graphic controller 1075 uses a video memory 1077 as the frame buffer for storing the image data generated by the CPU 1000.

The input/output controller 1084 connects the host controller 1082 to the communication interface 1030, hard disk drive 1040, and CD-ROM drive 1060, which are relatively high speed input/output devices. The communication interface 1030 communicates with another apparatus via a network. The hard disk drive 1040 stores the program and data for use by the WWW server 20 or the information terminal 30. The CD-ROM drive 1060 reads program instructions or data from a CD-ROM 1095, and supplies the program instructions or data to the input/output chip 1070 via the RAM 1020.

The input/output controller 1084 is connected to the ROM 1010, and to relatively low speed input/output devices such as the flexible disk drive 1050 and input/output chip 1070. The ROM 1010 stores a boot program executed by the CPU 1000 at a start time of the WWW server 20 and program instructions that depend on the specific hardware of the WWW server 20. The flexible disk drive 1050 reads the program instructions or data from a flexible disk 1090, and supplies the program instructions or data to the input/output chip 1070 via the RAM 1020. The input/output chip 1070 is connected to the flexible disk 1090, and various input/output devices, for example via a parallel port, a serial port, a keyboard port, or a mouse port. The input/output chip 1070 receives the data in response to the user's input, and supplies the data to the program executed on the WWW server 20.

The program instructions supplied to, and executed by, the WWW server 20 include a page transmission module and a return processing module. The program instructions supplied to, and executed by, the information terminal 30 include a page reception module, a page storage module, a page display module, an input information storage module, an input information transmission module, a return information storage module, and a return information display module.

The program instructions for the WWW server 20 or information terminal 30 are stored in program recording media such as the flexible disk 1090, CD-ROM 1095, and IC card, and may be supplied by the user. The program instructions may be read from the program recording medium, and installed and executed in the WWW server 20, or supplied to the information terminal 30 via the communication interface 1030.

The above-described program instructions or modules may also be stored in an external storage medium. In addition to the flexible disk 1090 and CD-ROM 1095, optical recording media such as DVD and PD, magnetic optical recording media such as MD, tape media, and semiconductor memories such as the IC card can be used as the storage medium. Storage devices such as the hard disk and RAM disposed in a server system connected to a communication network or Internet may be used as the recording media, and the program instructions may be supplied to the WWW server 20 via the network.

As apparent from the above description, since the communication system 10 allows the information terminal 30 to combine the input information as it is entered element by element by the user, and to send the combined information to the WWW server 20, the WWW server 20 receives the desired input information compactly, and can quickly perform the required processing.

Moreover, even when its screen is too small to display or accept entry of the input information in its entirety, with the present invention the information terminal 30 can enable the user to perform the desired input and to transmit the information without requiring any intricate operation.

The WWW server 20 may already have the needed reception processing section and apparatus (e.g., a personal computer) including a display screen sized such that the desired input information can be entered in its entirety. In this case, without changing the reception processing section, the server can be used as the reception processing section for the small-screen of the information terminal 30. For example, once the input page for the personal computer is prepared, a manager of the WWW server 20 need only divide the input page to get a plurality of input pages that are suitable for the smaller display screen of the information terminal 30. Accordingly, without using new equipment for receiving the input parameters, a comfortable input environment can be provided for the user of the information terminal 30. Therefore, the manager of the WWW server 20 can use the communication system 10 according to the present invention to easily transplant input pages prepared on the personal computer to the information terminal 30.

The present invention has been described above using an embodiment that is exemplary rather than limiting; the scope of the present invention is not limited to the scope of the above-described embodiment. Various changes or improvements can be made to the above-described embodiment.

We claim:

1. An information terminal which displays input pages downloaded from a server via a network, and which transmits, using the network, information entered into the input pages by a user, said information terminal comprising:
   a page display section for displaying a plurality of input pages using a browser executed by the information terminal;
   an input information storage section for storing a plurality of input parameters entered by a user into more than one of the input pages;
   an input information transmission section for transmitting the plurality of input parameters in response to an instruction; and
   a page reception section for receiving the input pages and for associating the input pages with package identification information, wherein the input pages enable a user to enter the plurality of input parameters, and further wherein the input information transmission section combines the input parameters entered into the input pages of a package and transmits the combined input parameters to the server.

2. The information terminal according to claim 1,
   wherein the input information storage section associates input identification information for identifying input information of a package with the input parameters, and
   wherein the input information transmission section selects and combines input parameters entered into the input pages of a package and which are associated with the same input identification information from among the input parameters stored in the input information storage section, and transmits the resulting combination as the input information.

3. The information terminal according to claim 1, wherein the input information transmission section combines the input parameters and transmits the combination after all of the input parameters of a package have been stored in the input information storage section.

4. The information terminal according to claim 1, further comprising a page storage section for storing the input pages and associating the plurality of input pages with package identification information;
   wherein the page reception section receives the input pages and associates the input pages with information for identifying a display order; and further
   wherein the page display section displays a selected input page stored in the page storage section, and then, responsive to receiving an indication that entry of input into the selected input page is complete, displays the input page that is next according to the display order.

5. The information terminal according to claim 1,
   wherein the page reception section receives destination information for identifying a return destination of the input information, associates the destination information with package identification information; and
   the input information transmission section selects and combines a plurality of input parameters of a package from the information storage section, and transmits the resulting combination to the return destination identified by the destination information associated with the package.

6. The information terminal according to claim 1, further comprising:
   an input information display section for displaying input parameters stored in the input information storage section; and
   a selection section for enabling the user to select input information to be transmitted;
   wherein the input information transmission section transmits the selected input information.

7. The information terminal according to claim 1, further comprising an online detection section for determining whether the information terminal can communicate with an external apparatus, wherein the input information transmission section transmits the combined input parameters responsive to a determination of whether the information terminal can communicate with the external apparatus.

8. The information terminal according to claim 1, further comprising:
   a return information storage section for associating return information from a server which has received the combined input parameters with information for identifying the server and storing the return information; and
   a return information display section for displaying the return information responsive to an instruction to display the return information.

9. A transmission-reception proxy apparatus for displaying input pages downloaded from a server to an information terminal via a network, and for transmitting information entered into the input pages by a user, the proxy apparatus comprising:
   a page display section for displaying a plurality of input pages using a browser executed on the information terminal;
   an input information storage section for storing a plurality of input parameters entered using more than one of the input pages;
   an input information transmission section for transmitting the plurality of input parameters in response to an instruction to transmit the plurality of input parameters; and
   a page reception section for receiving the input pages and for associating the input pages with package identification information, wherein the input pages enable a user to enter the plurality of input parameters, and further wherein the input information transmission section combines the input parameters entered into the input pages of a package and transmits the combined input parameters to the server.

10. A communication system comprising a server for storing a plurality of input pages and an information terminal for accepting a user's entries into the input pages, wherein the server comprises a page transmission section for transmitting the input pages in response to an instruction from the information terminal, said information terminal comprising:
    a page reception section for transmitting the instruction from the information terminal and for receiving the input pages;
    a page display section for displaying the input pages using a browser executed on the information terminal;
    an input information storage section for storing a plurality of input parameters entered using more than one of the input pages;
    an input information transmission section for combining the input parameters and transmitting combined input parameters in response to an instruction; and
    a page reception section for receiving the input pages and for associating the input pages with package identification information, wherein the input pages enable a user to enter the plurality of input parameters, and further wherein the input information transmission section combines the input parameters entered into the input pages of a package and transmits the combined input parameters to the server.

11. A method of communication between a server which stores a plurality of input pages and an information terminal which accepts a user's input entered using more than one of the input pages, comprising the steps of:
- transmitting a plurality of input pages from a server to an information terminal in response to a request from the information terminal;
- receiving the input pages by the information terminal;
- displaying the input pages using a browser executed on the information terminal;
- storing, in a memory of the information terminal, a plurality of input parameters entered using more than one of the input pages;
- combining the stored input parameters according to package identification information; and
- transmitting the combined input parameters from the information terminal to the server in response to an instruction.

12. A program product enabling a computer to function as an information terminal which displays input pages downloaded from a server via a network and transmits information entered into the input pages by a user, said program product providing modules of computer usable program code tangibly embodied in a computer usable storage medium, said modules comprising:
- a page display module for displaying input pages using a browser executed on the information terminal;
- an input information storage module for storing a plurality of input parameters entered using more than one of the input pages;
- an input information transmission module for transmitting the plurality of input parameters in response to receiving an instruction; and
- a page reception module for receiving the input pages and for associating the input pages with package identification information, wherein the input pages enable a user to enter the plurality of input parameters, and further wherein the input information transmission section combines the input parameters entered into the input pages of a package and transmits the combined input parameters to the server.

13. A computer usable recording medium that tangibly embodies modules of computer usable program instructions enabling a computer to function as an information terminal for displaying input pages downloaded from a server via a network and for transmitting, using the network, information entered by a user into more than one of the input pages, said recording medium comprising:
- a page display module for displaying a plurality of input pages using a browser executed on the information terminal;
- an input information storage module for storing a plurality of input parameters entered using more than one of the input pages;
- an input information transmission module for transmitting the plurality of input parameters in response to an instruction to transmit the plurality of input parameters; and
- a page reception module for receiving the input pages and for associating the input pages with package identification information, wherein the input pages enable a user to enter the plurality of input parameters, and further wherein the input information transmission section combines the input parameters entered into the input pages of a package and transmits the combined input parameters to the server.

* * * * *